United States Patent
Kikuchi et al.

[11] Patent Number: 6,106,160
[45] Date of Patent: Aug. 22, 2000

[54] OPTICAL TRANSMITTING AND RECEIVING MODULE

[75] Inventors: Kimihiro Kikuchi; Yoshihiro Someno; Atsunori Hattori; Shoichi Kyoya, all of Miyagi-ken, Japan

[73] Assignee: Alps Electric Co., Ltd., Japan

[21] Appl. No.: 09/133,767

[22] Filed: Aug. 12, 1998

[30] Foreign Application Priority Data

Aug. 18, 1997 [JP] Japan ................................. 9-221589

[51] Int. Cl.[7] .................................................. G02B 6/36
[52] U.S. Cl. ............................... 385/88; 385/93; 359/131
[58] Field of Search ................................. 385/88, 89, 93; 359/131, 152, 154, 157, 581, 589, 590

[56] References Cited

U.S. PATENT DOCUMENTS 5,663,821  9/1997  Suda et al. .
5,867,622  2/1999  Miyasaka et al. .................... 385/88

*Primary Examiner*—James Phan
*Attorney, Agent, or Firm*—Brinks Hofer Gilson & Lione

[57] ABSTRACT

A dielectric multilayer film which has a bandpass characteristic in which a light beam having a wavelength $\lambda 2$ passes and a light beam having any of the other wavelengths is blocked is formed on the emergent-side surface of a lens provided near a light-receiving device which receives a light beam having the wavelength $\lambda 2$. A dielectric multilayer film which has a bandpass characteristic in which a light beam having a wavelength $\lambda 1$ passes and a light beam having any of the other wavelengths is blocked is formed on the emergent-side surface of a lens provided near another light-receiving device which receives a light beam having the wavelength $\lambda 1$.

2 Claims, 4 Drawing Sheets

OPTICAL TRANSMITTING AND RECEIVING MODULE

BACKGROUND OF THE INVENTION

1. Field of the Invention

The present invention relates to an optical transmitting and receiving module for coupling a light emitting device and a light receiving device with an optical fiber through which a plurality of transmitting light beams and receiving light beams having different wavelengths are transferred.

2. Description of the Related Art

There has been known an optical transmitting and receiving module which has a filter in order that a light beam with an unwanted wavelength is not incident on a receiving device, as that disclosed in Japanese Unexamined Patent Publication No. 8-160259. FIG. 6 shows a structure of such a conventional optical transmitting and receiving module. A light beam having a wavelength $\lambda 1$ emitted from a light emitting device 1 passes through an optical demultiplexing filter 2, is incident on an end face of an optical fiber 3, and is transmitted through the optical fiber 3. A light beam having a wavelength $\lambda 2$ received through the optical fiber 3 comes out from the end face of the optical fiber 3, is reflected from the optical demultiplexing filter 2, is collected by a lens 4, and is received by a light receiving device 6 through a filter 5. The filter 5 has a wavelength-selection feature in which a light beam having the wavelength $\lambda 2$ passes through the filter 5 and a light beam having a wavelength other than the wavelength $\lambda 2$ does not penetrate the filter 5.

Since the filter 5 for blocking a light beam having an unwanted wavelength from the light receiving device 6 is required for the above conventional optical transmitting and receiving module, however, the cost thereof is increased. In addition, because a space for placing the filter 5 is required, the module is prevented from being made compact.

SUMMARY OF THE INVENTION

Accordingly, it is an object of the present invention to provide an inexpensive optical transmitting and receiving module in which the filter used in the conventional optical transmitting and receiving module is not provided, a space for installing such a filter is not required, and a light beam having a unwanted wavelength is not incident on the light receiving device.

The foregoing object is achieved according to the present invention through a provision of an optical transmitting and receiving module including: a light emitting device for emitting a transmitting light beam having a first wavelength; an optical demultiplexing filter for passing in the direction of an optical fiber the transmitting light beam emitted from the light emitting device; a lens for collecting a receiving light beam having a second wavelength, which is emitted from an end face of the optical fiber and is reflected from the optical demultiplexing filter; and a light receiving device for receiving the receiving light beam collected by the lens, wherein a film having a wavelength-selection feature in which a light beam having the second wavelength passes and a light beam having any of the other wavelengths is blocked is formed on at least one surface of the lens.

In this inexpensive optical transmitting and receiving module, a less space is required than before and a light beam having an unwanted wavelength is not incident on the light-receiving device.

In the optical transmitting and receiving module, the lens may be a convex lens having a flat surface at an emergent side. In this case, a dielectric multilayer film which has a relatively uniform film thickness can be formed and the desired wavelength-selection feature is easily obtained.

The lens may have convex shapes at both surfaces.

DESCRIPTION OF THE PREFERRED EMBODIMENT

Figure 1:
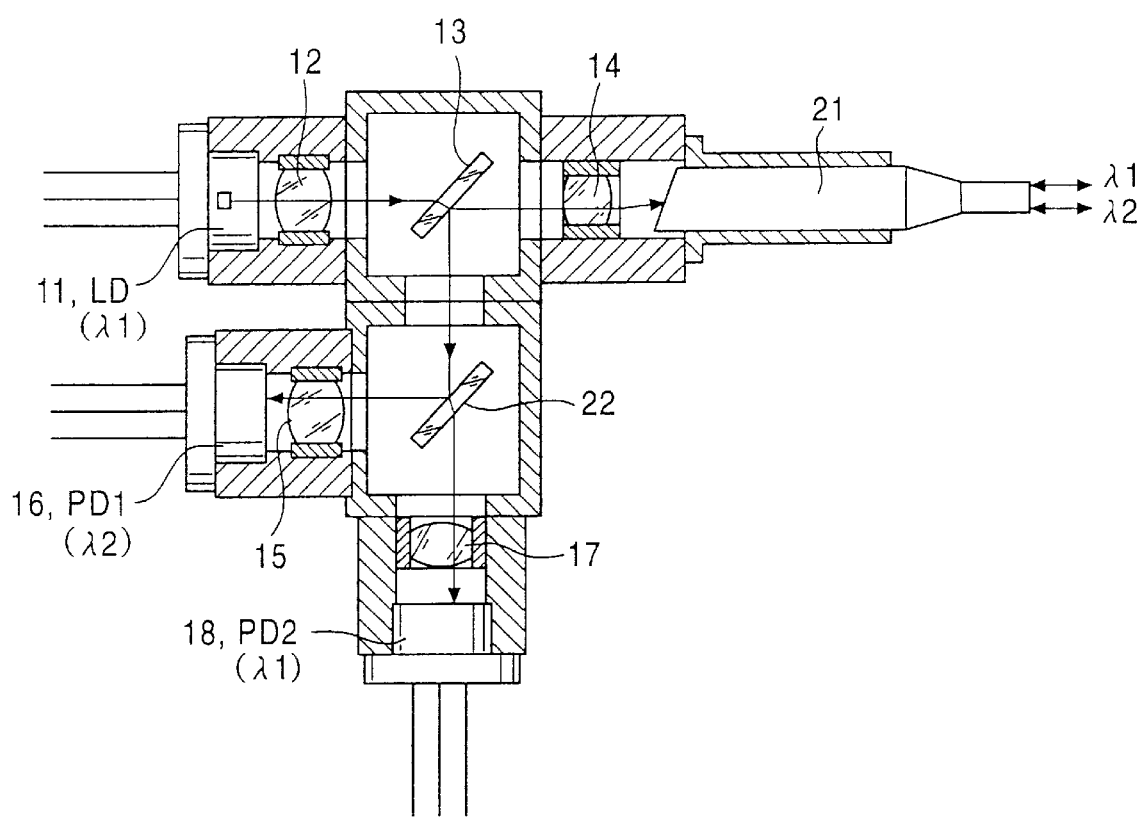
FIG. 1 is a structural view of an optical transmitting and receiving module according to an embodiment of the present invention.
Figure 2:
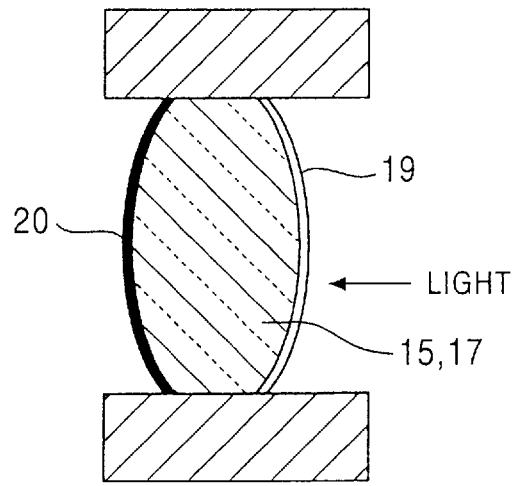
FIG. 2 is an extended side view of a light receiving lens shown in FIG. 1.
Figure 3A:
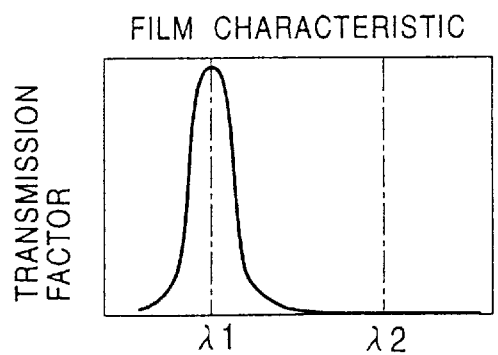
FIGS. 3A and 3B are graphs indicating wavelength-selection features of dielectric multilayer films shown in FIG. 2.
Figure 3B:
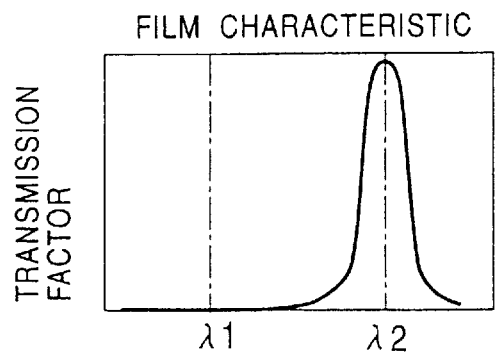

An embodiment of the present invention will be described below by referring to the drawings. FIG. 1 is a structural view of an optical transmitting and receiving module according to an embodiment of the present invention. FIG. 2 is an extended side view of a light receiving lens shown in FIG. 1. FIGS. 3A and 3B indicate wavelength-selection features of dielectric multilayer films.

In FIG. 1, there is shown an optical transmitting and receiving module which transmits a light beam having one wavelength and receives light beams having two wavelengths. A light beam having a wavelength $\lambda 1$ emitted from a light emitting device 11 (LD) is made parallel by a lens 12, passes through an optical demultiplexing filter 13, is collected at an end face of an optical fiber 21 by a lens 14, is incident on the end face of the optical fiber 21, and is transmitted through the optical fiber 21. Light beams having wavelengths $\lambda 1$ and $\lambda 2$ received through the optical fiber 21 come out from the end face of the optical fiber 21, is made parallel by the lens 14, and is reflected from the optical demultiplexing filter 13. In the reflected light beams, the light beam having the wavelength $\lambda 2$ is reflected from an optical demultiplexing filter 22, is collected by a lens 15 so as to form an image on a light receiving surface of a light receiving device 16 (PD 1), and is received by the light receiving device 16. On the other hand, in the light beams reflected from the optical demultiplexing filter 13, the light beam having the wavelength $\lambda 1$ passes through the optical demultiplexing filter 22, is collected by a lens 17 so as to form an image on a light receiving surface of a light receiving device 18 (PD 2), and is received by the light receiving device 18.

As shown in FIG. 2, on the incident-side surfaces of the lenses 15 and 17 provided near the light receiving devices 16 and 18, respectively, reflection-preventing films 19 are formed. On the emergent-side surface of the lens 15, provided near the light receiving device 16, which receives a light beam having the wavelength $\lambda 2$, a dielectric multilayer film 20 having a bandpass characteristic shown in FIG. 3B in which a light beam having the wavelength $\lambda 2$ passes and a light beam having any of the other wavelengths is blocked is formed. On the other hand, on the emergent-side surface of the lens 17, provided near the light receiving device 18, which receives a light beam having the wavelength λ1, a dielectric multilayer film 20 having a bandpass characteristic shown in FIG. 3A in which a light beam having the wavelength λ1 passes and a light beam having any of the other wavelengths is blocked is formed.

According to the optical transmitting and receiving module configured as described above, since the dielectric multilayer films 20 are formed on the lenses 15 and 17 at one side of each lens, the filter used in the conventional optical transmitting and receiving module is not required and a light beam having an unwanted wavelength is not incident on the light receiving devices 16 and 18. Therefore, the inexpensive optical transmitting and receiving module which can be made compact is implemented.

Figure 4:
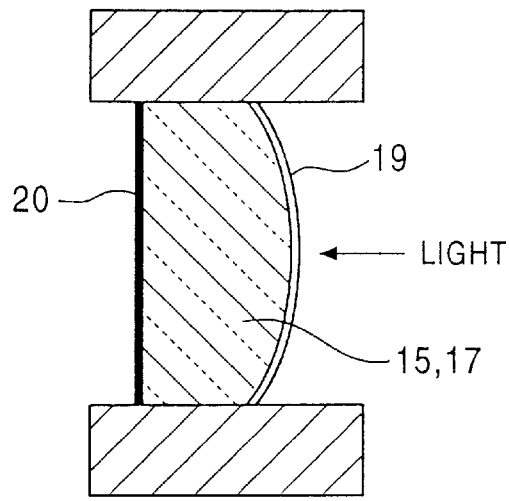
FIG. 4 is an extended side view of a modification of the light receiving lens shown in FIG. 2.

The lenses 15 and 17, shown in FIG. 2, have convex shapes at both surfaces thereof. Therefore, it is difficult to uniformly coat the lens surfaces with the dielectric multilayer films 20, and the desired wavelength-selection feature may be obtained only in some cases. When a convex lens having a flat shape at the emergent side is used for the lenses 15 and 17 and the dielectric multilayer films 20 are formed on the flat surfaces, as shown in FIG. 4, the dielectric multilayer films have relatively uniform film thicknesses. Consequently, the desired wavelength-selection feature is obtained.

Figure 5A:
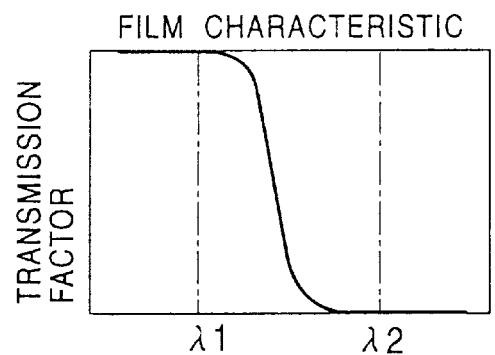
FIGS. 5A and 5B are graphs indicating other wavelength-selection features of the dielectric multilayer films shown in FIG. 2.
Figure 5B:
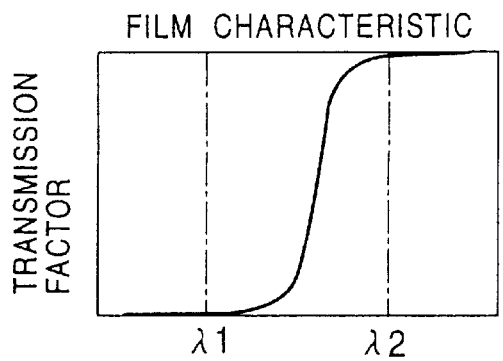
Figure 6:
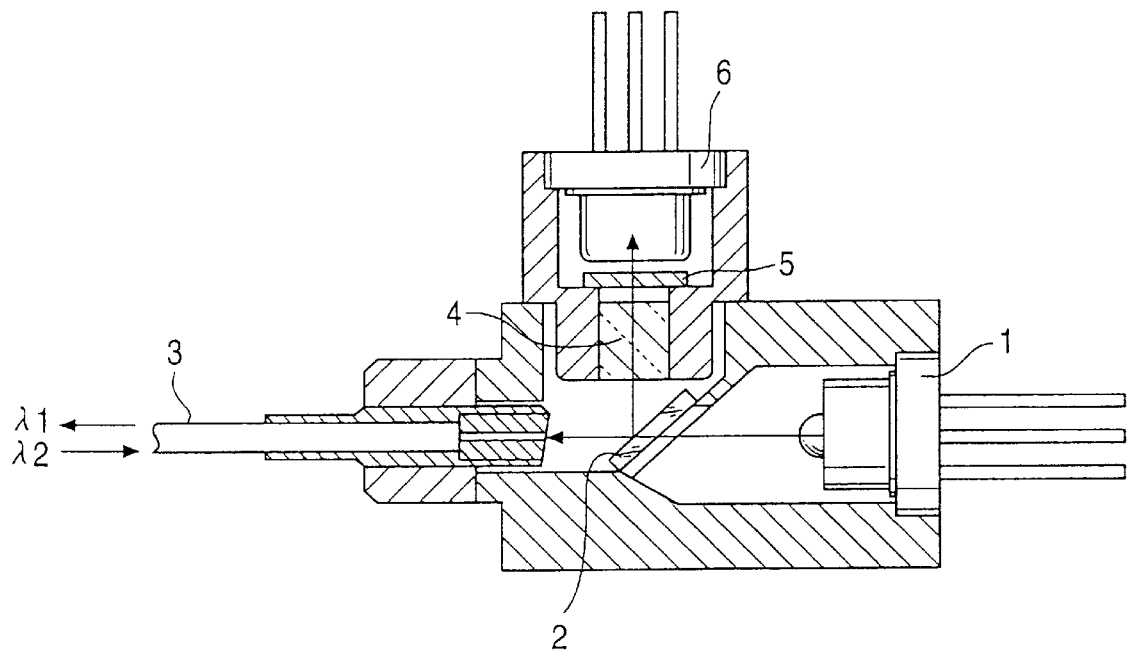
FIG. 6 is a structural view of a conventional optical transmitting and receiving module.

Instead of the bandpass characteristics, the dielectric multilayer films 20 may have characteristics shown in FIGS. 5A and 5B, which have sharp edges.

In the above embodiment, the optical transmitting and receiving module transmits a light beam having one wavelength and receives light beams having two wavelengths. The present invention can also be applied to an optical transmitting and receiving module which transmits a light beam having one wavelength and receives a light beam having one wavelength, which is implemented by removing the lens 17 and the light receiving device 18.

What is claimed is:

1. An optical transmitting and receiving module comprising:

a light emitting device for emitting a transmitting light beam having a first wavelength;

an optical demultiplexing filter for passing in the direction of an optical fiber the transmitting light beam emitted from said light emitting device;

a lens for collecting a receiving light beam having a second wavelength, which is emitted from an end face of the optical fiber and is reflected from said optical demultiplexing filter; and a light receiving device for receiving the receiving light beam collected by said lens, wherein a film having a wavelength-selection feature in which a light beam having the second wavelength passes and a light beam having any of the other wavelengths is blocked is formed on at least one surface of said lens.

2. An optical transmitting and receiving module according to claim 1, wherein said lens is a convex lens having a flat surface at an emergent side.

* * * * *